US010274509B1

(12) United States Patent
Challoner et al.

(10) Patent No.: US 10,274,509 B1
(45) Date of Patent: Apr. 30, 2019

(54) INERTIAL MOTION TRACKING DEVICE

(71) Applicant: Inertialwave, Manhattan Beach, CA (US)

(72) Inventors: Anthony Dorian Challoner, Manhattan Beach, CA (US); Byron Campbell Challoner, Manhattan Beach, CA (US); Jeremy Daniel Popp, Duvall, WA (US)

(73) Assignee: Inertialwave, Manhattan Beach, CA (US)

( * ) Notice: Subject to any disclaimer, the term of this patent is extended or adjusted under 35 U.S.C. 154(b) by 688 days.

(21) Appl. No.: 14/683,137

(22) Filed: Apr. 9, 2015

Related U.S. Application Data

(60) Provisional application No. 61/977,569, filed on Apr. 9, 2014.

(51) Int. Cl.
*G01C 22/00* (2006.01)
*G01P 13/00* (2006.01)
(52) U.S. Cl.
CPC .............. *G01P 13/00* (2013.01); *G01C 22/00* (2013.01)
(58) Field of Classification Search
CPC ...................................................... G01P 13/00
USPC ......................................... 340/5.81; 702/150
See application file for complete search history.

(56) References Cited

U.S. PATENT DOCUMENTS

| 6,292,751 | B1 | 9/2001 | Frank | |
|---|---|---|---|---|
| 6,532,419 | B1* | 3/2003 | Begin | G01C 21/28 701/504 |
| 7,350,303 | B2 | 4/2008 | Rock | |
| 9,772,186 | B1* | 9/2017 | Tanenhaus | G01C 21/165 |
| 2012/0007713 | A1* | 1/2012 | Nasiri | G06F 1/1694 340/5.81 |
| 2013/0217998 | A1* | 8/2013 | Mahfouz | A61B 8/4263 600/409 |

(Continued)

FOREIGN PATENT DOCUMENTS

WO        WO2004/046651        6/2004

OTHER PUBLICATIONS

Verplaetse, "Inertial Proprioceptive Devices: Self-motion-sensing sensing toys and tools," IBM Systems Journal, vol. 35, Nos. 3&4, pp. 639-650, 1996.

(Continued)

*Primary Examiner* — Marc Anthony Armand
(74) *Attorney, Agent, or Firm* — Canady & Lortz LLP; Bradley K. Lortz

(57) ABSTRACT

A compact autonomous device undergoing motion tracks and analyzes its definite movement relative to local Earth coordinates with optimal accuracy and repeatability of 1 mm over distances of greater than two meters. The Inertial Motion Tracking Device (IMTD) comprises a gyroscope, accelerometer, magnetometer, and digital processor programmed with a general purpose Inertial Measurement Engine (IME), an application specific Motion Analysis and Adaptation (MAA) program and a low power radio. The IMTD tracks its motion with optimum accuracy using compact practical sensors that may have noise and drift by periodically and autonomously checking its velocity changes at an optimum interval, computing a linear acceleration therefrom and determining a no-motion or motion condition relative to a threshold and correcting its velocity, position and acceleration errors when there is no motion.

17 Claims, 12 Drawing Sheets

(56) References Cited

U.S. PATENT DOCUMENTS

2013/0332098 A1\* 12/2013 Funk ..................... G01C 17/38
                                                                           702/93

OTHER PUBLICATIONS

Diebel, "Representing Attitude: Euler Angles, Unit Quaternions, and Rotation Vectors", Stanford University, Oct. 20, 2006.
Bezick et al., "Inertial Navigation for Guided Missile Systems", John Hopkins APL Technical Digest, vol. 28, No. 4, pp. 331-342, (2010).
Stirling, "Development of a Pedestrian Navigation System Using Shoe-Mounted Sensors", Master of Science Thesis, University of Alberta, Spring 2004.
Hoflinger et al., "A Wireless Micro Inertial Measurement Unit (IMU)," IEEE Transactions on Instrumentation and Measurement, vol. 62, No. 9, pp. 2583-2595, Sep. 2013.
Park et al., "A Zero Velocity Detection Algorithm Using Inertial Sensors for Pedestrian Navigation Systems," Sensors 2010, 10, 9163-9178.

\* cited by examiner

```
while t <= tfin
  j=j+1;
  [g,a,m,t]=readMPU(j,data,c_g,c_a,c_m,grav,fs,Kg,Ka,Km,Kt,kg,ka,c_t,type);
  %%%%%%%%%%%%%%%%%%%%%%%%%%%%%%%%%%%%%%%%%%%%%%%%%%%%%%%%%
  % Inertial Motion Engine (IME): Motion Attitude and Position Propagation (Streaming Version)
  %%%%%%%%%%%%%%%%%%%%%%%%%%%%%%%%%%%%%%%%%%%%%%%%%%%%%%%%%
  %Rotation vector (Quaternion) Inertial Attitude Propagation
  %Compute attitude and raw linear accel Qj=qprop(Qj,g-g_bias,dt); %Quaternion Propagation,with Euler integration %Transfer Body to Inertial Accel, Magnetometer and Rate
  dcm=quat2dcm(Qj);
  Aj=(dcm'*a'-[0,0,-1]')';
  Mj=(dcm'*m')';
  Wj=(dcm'*(g-g_bias)')';
  %% Rotations
  Rj=Rj+ Wj*dt;                    %Could use Quaternion to Euler transform in lieu of integration Lj= Aj - L_bias;
  Vj= Vj + Gravity*Lj*dt;
  Pj= Pj + Vj*dt;
```

Fig 1B

```
%%%%%%%%%%%%%%%%%%%%%%%%%%%%%%%%%%%%%%%%%%%%%%%%
%-4: Inertial Measurement Engine (IME): No-Motion Acceleration, Velocity, Position
%   and Attitude Correction (Streaming Version)
%%%%%%%%%%%%%%%%%%%%%%%%%%%%%%%%%%%%%%%%%%%%%%%%
Sg=Sg+g; Sa=Sa+a; Sm=Sm+m;                    %Sensor mean accumulators if mod(j,Nm)==0,
    Vn=Vj;
    LA=(Vn-Vn_last)/Tm/Gravity;
    if norm(LAn(xsel)) < LA_thresh,
        no_motion = 1;                         %no_motion condition
        Vj_1=[0,0,0];                          %Reset velocity integrator
        Pj_1=[0,0,0];                          %Reset position integrator
        Vj=Vj_1+Gravity*Lj*dt;
        Pj=Pj_1+Vj*dt;
        %%Linear Acceleration Error Correction Update
        L_bias=k_Lb*LA+L_bias;
        %%Gyro bias and attitude update during no_motion
        g_bias=k_gb*(Sg/Nm-g_bias)+g_bias;
        a0 = Sa/Nm;
        m0 = Sm/Nm;
        DCM1=CompDCMStart(eye(3),m0,a0);
        Edcm=dcm2euler(DCM1');
        Qj=euler2quat(Edcm);
        %%%%%%%%%%%%%%%%%%%%%%%%%%%%%%%%%%%%%%
    else,
        no_motion = 0;
    end
    Sg=0*Sg;Sa=0*Sa;Sm=0*Sm;
    Vn_last=Vj;
    Pn_last=Pj;
end
```

Fig 1C

```
%%%%%%%%%%%%%%%%%%%%%%%%%%%%%%%%%%%%%%%%%%%%%%%%%%%%%%%%%%
%6: Motion Analysis Application(MAA): Kite Board Jump Parameter Analysis
%%%%%%%%%%%%%%%%%%%%%%%%%%%%%%%%%%%%%%%%%%%%%%%%%%%%%%%%%%
%Rotations
Rt=norm(Rj(1:2));
Rot=abs(Rj(3));
LzN=abs(Lj(3));
jmpj_1=jmpj;
if Pj(3)<=-air_thresh, % Positive Z axis is Down
    jmpj=1;
    if jmpj_1==0, tstart=t; ijstart=j;end
    if Pj(3)<Pzmin, Pzmin=Pj(3);ijpk=j;end
    if LzN>gmax,gmax=LzN;end
    if Rt>Rtmax, Rtmax=Rt;end
    if Rot>Rotmax, Rotmax=Rot;end
else,
    jmpj=0;
end
if jmpj==0 && jmpj_1==1,
    k_j=k_j+1;
    tstop=t; ijstop=j;
    tair=tstop-tstart;
    KPP(k_j,1:8)=[ijstart,ijstop,ijpk, tair,abs(Pzmin),gmax,Rotmax,Rtmax];
    Pzmin=0;gmax=0;Rtmax=0;Rotmax=0;
end
if mod(j,Nm)==0 && no_motion==0,    % save last motion values
    Vn_last_mo = Vj;
    Pn_last_mo = Pj;
    t_last_mo = t;
end
if no_motion == 1 && no_motion_1==0,
    KPP(k_j,9:15)=[t_last_mo, Vn_last_mo,Pn_last_mo];
end
% adapt Tm, LA_thresh, V_thresh,k_Lb,k_gb,as needed for each motion app
no_motion_1=no_motion;
```

Fig 1D

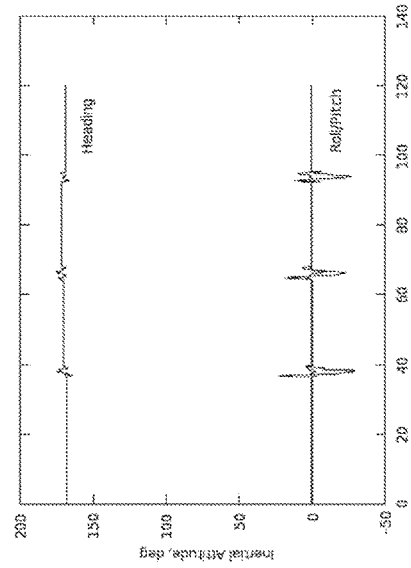
Fig. 1E
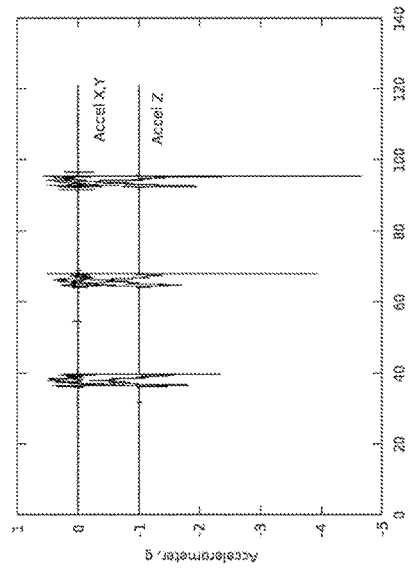
Fig. 1F
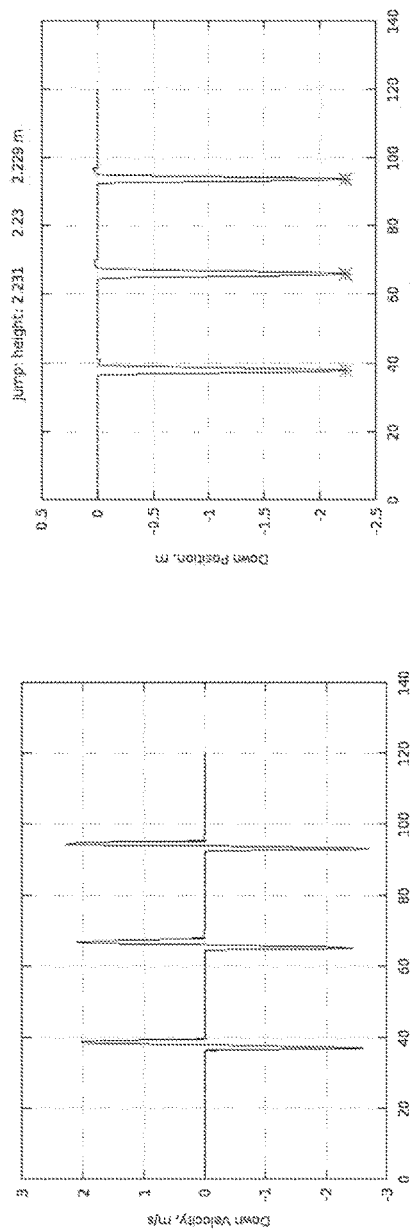
Fig. 1G
Fig. 1H

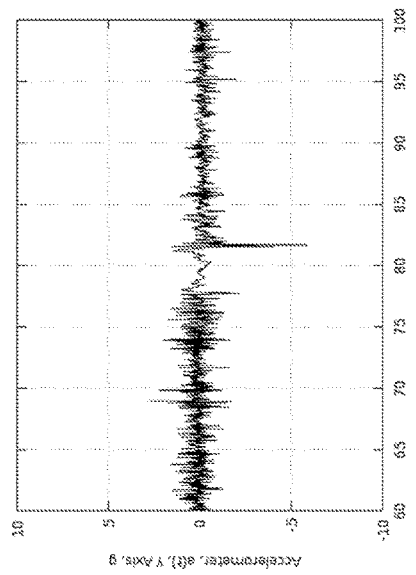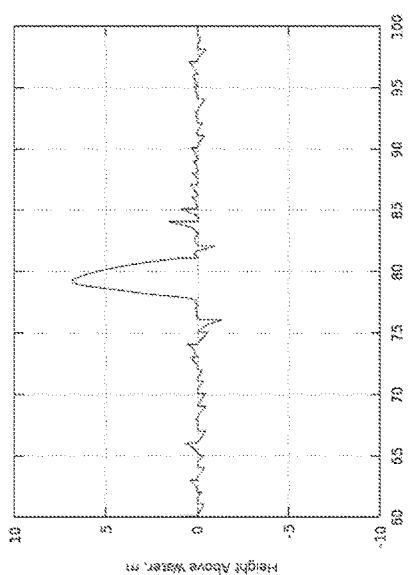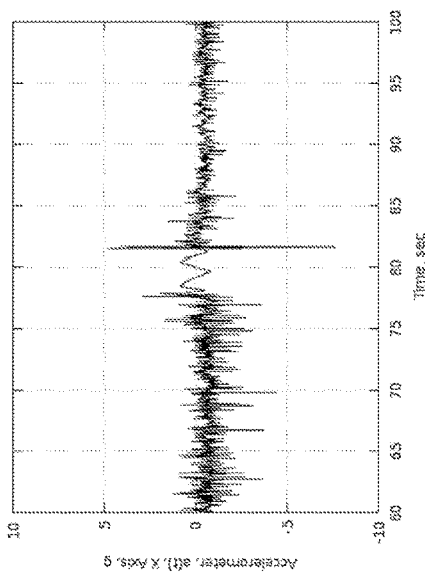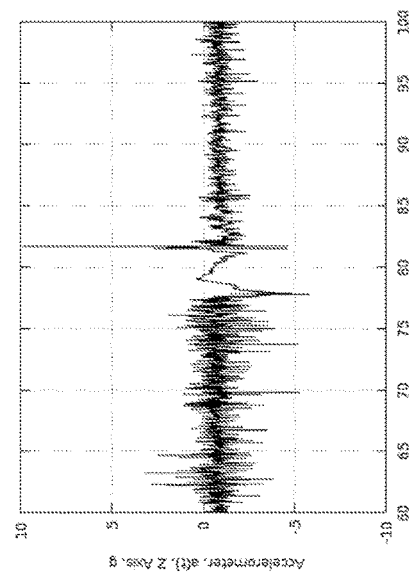

INERTIAL MOTION TRACKING DEVICE

CROSS-REFERENCE TO RELATED APPLICATIONS

This application claims the benefit under 35 U.S.C. § 119(e) of the following U.S. provisional patent application, which is incorporated by reference herein:

U.S. Provisional Patent Application No. 61/977,569, filed Apr. 9, 2014, and entitled "Inertial Motion Tracking Device," by Challoner et al.

BACKGROUND OF THE INVENTION

1. Field of the Invention

The present disclosure relates to the measurement of the motion of a human or an object using a compact autonomous device capable of tracking its own motion and comprising inertial sensors such as MEMS sensors, an embedded motion processor, a power source and a radio.

2. Description of the Related Art

There is a need for accurate and easy to use measurement of personal motion and the motion of personal objects with high resolution and accuracy. Human motion events often involve deliberate moments with little or no intentional motion followed by moments of very definite, sudden and unpredictable motion with a high dynamic range of rotation rates and accelerations. For example a rider on a kite board moving swiftly along the ocean surface suddenly leaps 7 meters in the air within 1 second with 3 or 4 g's of peak acceleration and more than 360 degrees of rotation. A MEMS Inertial Measurement Unit (IMU) mounted on the board with a navigation or motion tracking algorithm could in principle keep track of this motion autonomously and report the achieved jump height to the rider. Alternatively, a MEMS IMU in a smartphone or dedicated device could be positioned at one end of an object such as a table and then moved quickly to the other end and stopped briefly to measure its length. The applications for a compact, accurate and easy to use inertial motion tracking device are limitless.

The application of commercial inertial MEMS for simple, easy to use tracking and measurement of natural human motion have been anticipated since at least 1996 with high expectations of accuracy based on theoretical sensor noise calculations to at least the millimeter resolution level. See Verplaetse, C., IBM SYSTEMS JOURNAL, VOL 35, NOS 3&4, 1996, "Inertial Proprioceptive Devices: Self-motion-sensing sensing toys and tools," which is incorporated by reference herein. This expectation, however, has still not been met in either available products or publication of measurements. MEMS IMU chip manufacturers furnish direct on-chip integration of inertial rate to provide high resolution and accurate three-axis attitude or quaternion digital output. The method for accumulating incremental attitude changes using a rotation vector computed from a gyroscope inertial rate is well known, and quite simple mathematically. See Diebel "Representing Attitude: Euler Angles, Unit Quaternions, and Rotation Vectors", Stanford University, 20 Oct. 2006, which is incorporated by reference herein. This simple procedure can be implemented right in the MEMS chip itself with an embedded digital motion processor (DMP) having direct, highest quality sensor access, to additionally provide motion sensing logic and on-chip calibration of some sensor errors such as gyro bias. Embedding or collocating digital processing on the same chip as high performance inertial MEMS analog circuits inherently involves a compromise in the complexity of digital processing that can be implemented. Unfortunately, no MEMS IMU chip currently offers any position measurement functionality, or even such code for host processor applications, no quantitative statement of accuracy and only an abundance of caution to developers about the large accumulated drift errors associated with integrating acceleration to determine position. It is preferable to do the inertial position tracking also in the DMP since, as noted, it is already integrating gyro rate data to generate the attitude. However it has limited digital processing capability and there is a general belief that complex navigation filter processing, e.g., Extended Kalman Filtering, as developed for military or aerospace navigation is required. See Bezick et al., "Inertial Navigation for Guided Missile Systems", JOHN HOPKINS APL TECHNICAL DIGEST, VOLUME 28, Number 4 (2010), which is incorporated by reference herein.

Additionally, there has been a significant failure to correct the errors associated with utilizing commercial MEMS sensors that have both high noise and high drift with time for navigation. PDAs of the 1990's have evolved into today's smartphones comprising inertial MEMS IMUs and magnetometers and formidable 32-bit processing capability that could easily implement the most complex aerospace navigation algorithms. Sophisticated navigation algorithms and multi state optimal filters are suited for correcting certain observable sensor errors over long flight times but not for MEMS error correction in unpredictable high dynamic motion applications involving hundreds of degrees per second rate and fast high g accelerations associated with hand held objects or sports equipment used in human consumer motion applications. Simple filtering would reduce the sensor noise contribution or ambient vibrations to error when there is no definite motion and would allow more accurate determination and correction of errors. However, filtering is problematic for autonomous applications such as personal sports motion tracking in which there is no anticipation of high dynamic motion and hence when to enable and disable the filtering. Filtering in unpredictable high dynamic environments further introduces response lag and errors.

A solution to the portable inertial measurement problem proposed by Rock et al. in 2004 (PCT Application No. WO2004/046651, which is incorporated by reference herein) introduces a "user-actuated trigger, indicating, at that moment in time, that the measuring device is stationary i.e. with zero velocity and zero translational acceleration". A more complex non-zero velocity update (NZUPT) was also introduced for some use cases but it was recognized the NZUPT procedure is not as accurate as ZUPT. Unfortunately, while it focuses on correcting the accumulated velocity error at that instant it does not address the issue of errors that will persist after the motion begins. Furthermore, for many applications it is undesirable or not possible to anticipate motion and for a user to actuate a trigger, e.g. sporting applications such as kite board motion tracking. Another limitation is the use of local attitude coordinates with an indefinite third axis, rather than definite and standard three-axis Earth coordinates. This makes the position coordinates for each measurement indefinite so precludes convenient and accurate mapping or coordination of multiple measurements.

Involving soldier or military personnel in active calibration procedures, such as a prescribed stop and go for zero velocity update (ZUPT) prior to start of use of inertial measurement equipment, e.g. for mine location measurement is not tolerable for most consumer applications. See U.S. Pat. No. 6,292,751 by Frank, which is incorporated by reference herein. Furthermore simply zeroing velocity, as also clearly noted in U.S. Pat. No. 6,292,751, does not preclude large measurement errors, even with military grade equipment. This requires further calibration or reconstruction after the motion event. The application of inertial MEMS attached to a shoe for pedometry exploits the natural periodicity and high linear or rotational contact acceleration transient characteristic of this particular human motion to trigger a zero velocity update. Pedometry-based approaches with errors of 3% of motion or 3 cm for a 1 m stride for highly predictable human periodic motion do not appear suitable for measuring general human motion tracking with millimeter repeatability. See Stirling, Ross, "Development of a Pedestrian Navigation System Using Shoe-Mounted Sensors", Master of Science Thesis, University of Alberta, Spring 2004, which is incorporated by reference herein. Thus, there is a need for more complete MEMS error correction.

In view of the foregoing there is a need for a compact autonomous device for general human motion tracking that accurately corrects for MEMS sensor errors and is intuitive and easy to use and adaptable to multiple applications. Preferably such a device would require only a simple digital computation process that can be embedded, ideally within the MEMS IMU itself, for lowest cost, lowest power and direct access for lowest-latency, highest, resolution sensor data. These and other needs are met by the present invention as detailed hereafter.

SUMMARY OF THE INVENTION

A compact autonomous device undergoing motion tracks and analyzes its definite movement relative to local Earth coordinates with optimal accuracy and demonstrated repeatability of 1 mm over distances of greater than two meters. The Inertial Motion Tracking Device (IMTD) can be mounted on equipment to measure motion parameters such as jump height during a sporting event and relay this information by radio or can be mounted in a hand held device such as a smartphone to easily and quickly determine the dimensions of a table or a room. The compact device comprises a gyroscope, accelerometer, magnetometer, and digital processor programmed with a general purpose Inertial Measurement Engine (IME), an application specific Motion Analysis and Adaptation (MAA) program and a low power radio. The IMTD tracks its motion with optimum accuracy using compact practical sensors that may have noise and drift by periodically and autonomously checking its velocity changes at an optimum interval, computing a linear acceleration therefrom and determining a no-motion or motion condition relative to a threshold and correcting its velocity, position and acceleration errors when there is no motion. The IME processing is simple yet general enough to usefully embed in a mass-produced MEMS IMU Chip or Universal Navigation Chip.

In accordance with one embodiment a compact device able to autonomously track its own definite motion comprising an accelerometer and a processor for computing the device's linear acceleration, velocity and position in a local, three-axis Earth coordinate frame where the linear acceleration error, velocity error and position error are autonomously measured and corrected within a selected brief time period immediately prior to start of definite motion but without anticipation or restriction of the time of start of motion wherein the linear acceleration correction is computed from the change in the velocity over the selected brief time period when there is no motion and the condition of no motion is determined by comparison to a selected motion threshold of the computed acceleration or the computed velocity from a change in position.

One example embodiment comprises an inertial motion tracking device (IMTD) including a microcontroller programmed with Inertial Measurement Engine (IME) that performs the operations of receiving accelerometer and gyroscope input; computing attitude, linear acceleration, velocity and position of the IMTD from the accelerometer and gyroscope input; autonomously determines a condition of no motion by a comparison to a selected motion threshold of the computed linear acceleration or the computed velocity from a change in position; and during said condition of no motion determines and corrects errors in said computed attitude, linear acceleration, velocity and position such that said errors do not result in accumulated errors in the computed position during a condition of motion.

The condition of no motion can be determined by the change in said computed velocity or the change in said computed position over a predetermined time period relative to a predetermined motion threshold. In some embodiments, a gyro bias and a linear acceleration error are determined and corrected during said condition of no motion wherein the correction of said gyro bias or said linear acceleration error is applied with a predetermined gain.

Further embodiments can also include a Motion Analysis and Adaptation (MAA) processor for a specific use of the IMTD that receives said IME computed attitude, linear acceleration, velocity and position outputs and computes a predetermined parameter of the motion during a motion condition. In some embodiments, the MAA can adapt said predetermined values of said time period for no motion determination, said predetermined value of said motion threshold or said predetermined gain. The IMTD can be used to make a length or distance measurement wherein the IMTD is stopped at a first reference position, moved and momentarily stopped at a second position and then returned to said first reference position wherein the IME no motion condition is determined by a motion threshold and the peak position value above a predetermined position threshold and relative to said first reference position is determined and reported by the MAA as said distance measurement.

The IME computation can be performed by a 16-bit microcontroller unit and/or by a MEMS chip. In some embodiments the IME computation can be performed by a smartphone processor or a Universal Navigation Chip. In some embodiments, the attitude is referenced to local Earth coordinates with magnetic North and said position is relative to a local reference position. The IMTD can also include a radio navigation receiver wherein said local reference position and said attitude are reset at each no-motion condition to the most recent position and attitude determined by said received radio navigation signal relative to global Earth coordinates.

BRIEF DESCRIPTION OF THE DRAWINGS

Referring now to the drawings in which like reference numbers represent corresponding parts throughout:

FIGS. 1B-1D show scripts detailing the IME and MAA program for real time streaming operation for an example Motion Analysis and Adaptation (MAA) program in accordance with the embodiment in FIG. 1A;

FIGS. 1E-1H show prototype height measurement results including MEMS IMU accelerometer output, a(t) in FIG. 1E, the device attitude derived from the MEMS IMU output, FIG. 1F, the integrated velocity, v(t) in FIG. 1G and the integrated position, p(t) FIG. 1H.

FIGS. 1M, 1N, 1P, and 1Q show kite board raw acceleration data and automatic jump position determinations using example IMTD processing;

DETAILED DESCRIPTION OF THE PREFERRED EMBODIMENT

1. Exemplary Inertial Motion Tracking Device (IMTD)

Figure 1A:
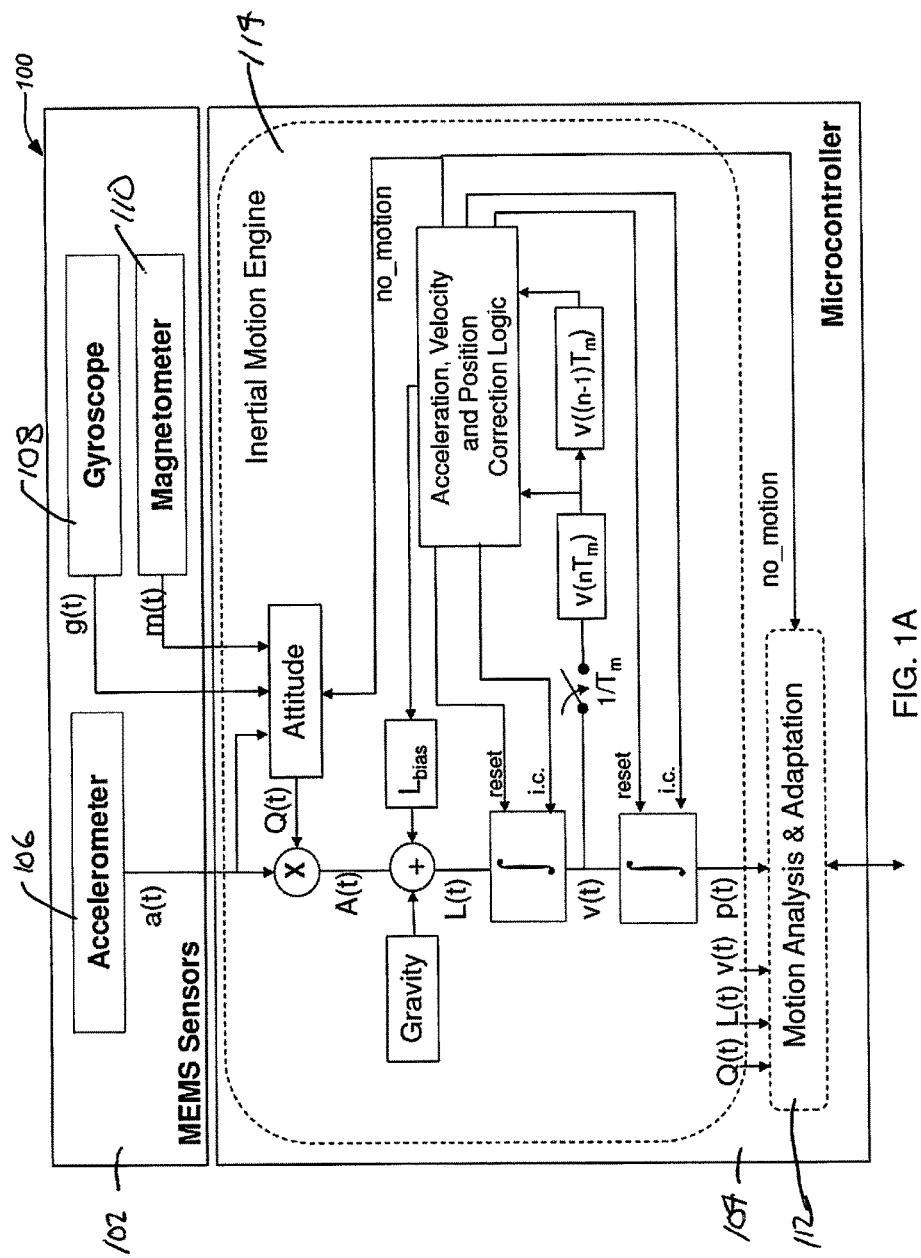
FIG. 1A shows an example Inertial Motion Tracking Device (IMTD) with a Microcontroller unit (MCU) operating an Inertial Measurement Engine (IME) program providing motion-dependent attitude and linear acceleration, velocity and position error correction (AVPC) block.
Figure 1I:
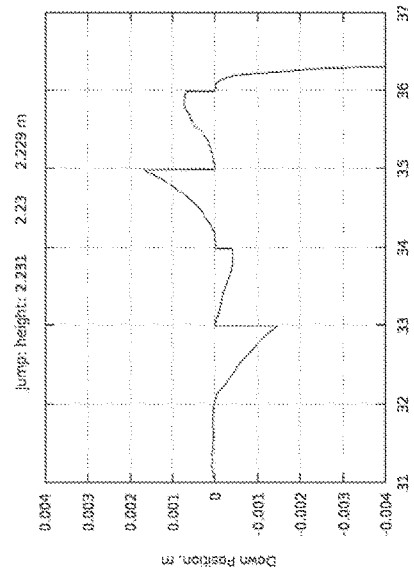
FIGS. 1I-1K show zoomed plots prior to first vertical motion event comprising the linear acceleration error correction, L_bias in FIG. 1I, the corrected velocity, v(t) in FIG. 1J and corrected position p(t) with the sought for 1 mm repeatability demonstrated in FIG. 1K.
Figure 1J:
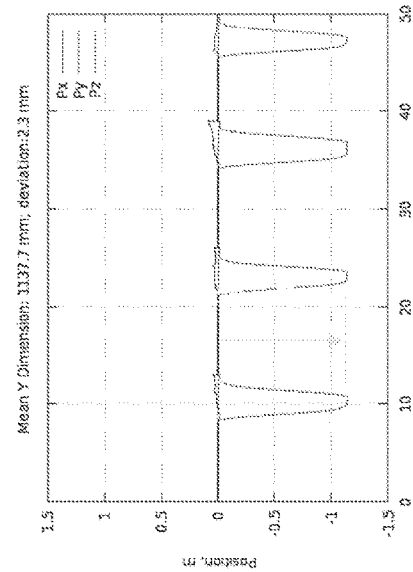
Figure 1K:
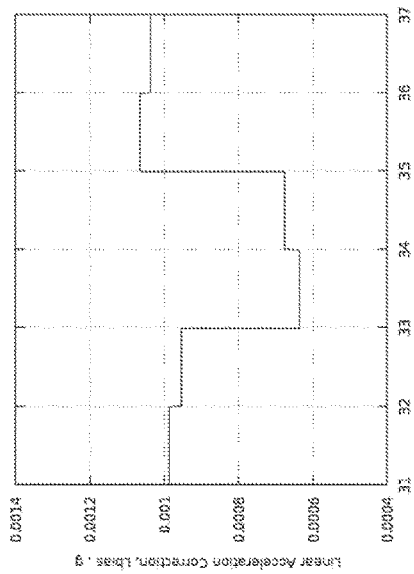

One embodiment of the inertial motion tracking device (IMTD) 100 comprising a MEMS Sensor 102 assembly and an embedded Microcontroller 104 is illustrated in FIG. 1A. The inertial sensors are contained in a 9-axis Microelectromechanical System (MEMS) Sensor 102 assembly or chip which outputs a 3-axis digital accelerometer 106 signal, a(t), 3-axis gyroscope 108 signal, g(t), and 3-axis magnetometer 110 signal, m(t), at a periodic sample frequency, fs, to an embedded Microcontroller Unit (MCU) 104. The MCU 104 operates an general Inertial Measurement Engine (IME) 114 program to process the accelerometer, gyroscope and magnetometer signals and compute the attitude, Q(t), linear acceleration, L(t), velocity, v(t), and position, p(t), for use by a specific Motion Analysis and Adaptation (MAA) 112 program also resident in the MCU. The MAA communicates the motion parameters of interest to a user such as jump height or distance via a low speed data link that may he much lower than fs.

Within the IME the gyro, accelerometer and magnetometer signals are received and used to compute the device attitude during motion and no motion in an Attitude processing block or subroutine. Motion attitude and position processing are detailed in FIG. 1B and no motion acceleration, velocity, position and attitude error correction is detailed in FIG. 1C. Motion attitude processing produces a parameterized quaternion attitude output signal, Q(t). This attitude signal Q(t) is applied to a coordinate transform function to transform the received body acceleration signal, a(t) to an acceleration signal A(t) in local coordinates. This transformed acceleration signal, A(t) is applied to the summer where the stored nominal value of local gravitational acceleration, Gravity, and the stored value of a computed linear acceleration bias, L_bias are removed to yield the corrected linear acceleration signal, L(t). It is this corrected linear acceleration signal that is finally applied to the first integrator function to compute the device velocity, v(t). The device velocity signal is then applied to the second integrator to compute the device position, p(t) which provides the primary motion tracking output of the IME to the Motion Analysis and Adaptation (MAA) processor in this embodiment of the IMTD.

It is noted that the initial condition and the reset function of the first, velocity integrator are supplied by an Acceleration, Velocity and Position Correction (AVPC) logic block whose detail function is defined in FIG. 1C and discussed further under Operation. The two inputs to the AVCP block of the IME are periodic samples of the velocity sampled at a specified period Tm or number of sensor samples Nm=fs*Tm. The first velocity input to the AVPC is shown after n samples and designated v(nTm) or Vn and the second velocity input is the previous sample of the velocity shown delayed by one Tm second period and designated as v((n−1)Tm). For example, Tm may be 1 second. The outputs from the AVPC block are a computed linear acceleration correction or bias, L_bias, a determined velocity integrator initial condition value, i.c., and a velocity integrator reset signal that causes the current velocity integrator output to be recomputed with the determined initial condition, i.c., and finally a no_motion signal that is used by the motion-dependent Attitude block within the IME and the Motion Analysis and Adaptation. Likewise, the initial condition and the reset of the second, position integrator are supplied by AVCP block with details defined in FIG. 1C and described under Operation.

The Motion Analysis and Adaptation program is a use-specific program operated by the MCU to receive the general processed attitude, Q(t), velocity, v(t) and position output from the IME and compute specific motion parameters of interest, e.g. jump height, or distance travelled and report at low frequency (<<fs) to a user. The latter feature is useful for an autonomous, IMTD device with limited power available to transmit at high data rate to a user. Typically such a device might use a Bluetooth Low Energy radio for direct reporting of motion parameters as an event is occurring.

In other embodiments the accelerometer, gyroscope and magnetometer signals may be received by the MCU from a single MEMS motion sensing chip such as the MPU9150 or MPU9250. The microcontroller may be a low power 16-bit single-chip MCU such as the Rensesas R78/GL13, a MCUs such as the Texas instruments MSP430 in which the functions in FIG. 1A are implemented in a firmware program. Alternatively, the simple structure of the signal processing lends itself to implementation with physical adders and multipliers as may be found in a field programmable gate array (FPGA) or an application specific integrated circuit (ASIC) such as may already be used in the MEMS IMU for digital motion processing for attitude signals.

FIGS. 1A to 1Q illustrate the manner in which the IMTD accurately tracks its velocity and position during definite motion. More particularly what is detailed, is how the ITMD automatically or autonomously determines a condition of no motion, corrects for any linear acceleration, velocity and position errors arising from its MEMS sensor errors immediately before the start of motion and then automatically and accurately tracks its definite motion with a simple computation suitable for embedding in the MEMS IMU itself and all of this requiring only motion of the IMTD for natural human motion tracking without user actuated trigger input.

Illustrative raw MEMS IMU sensor signals recorded during the test of an IMTD Prototype and intermediate computed signals are illustrated in FIGS. 1B through 1L. One example motion application is to measure the height of a kite board jump using a board-mounted IMTD Prototype. In a laboratory test the prototype was mounted on a 20 cm×30 cm wooden board and raised toward the ceiling three times in succession over the space of about two minutes. The test engineer was known to have good kinesthetic memory so the input motion was quite repeatable. The raw accelerometer signal, a(t) in FIG. 1A is illustrated in FIG. 1B with the attitude signal, Q(t) represented in FIG. 1C in terms of the three Euler angles, Roll, Pitch and Heading relative to magnetic north. The integrated velocity, v(t) is illustrated in FIG. 1D and position, p(t) in the Down direction in FIG. 1E. The height above the floor is at the negative peaks of the waveform in FIG. 1E and is recorded for each event above the figure as 2.231, 2.230 and 2.229 m, respectively and was repeatable to +/−1 mm. The measured peaks marked with an asterisk on the plot occur at a little over 1 second after motion starts.

A zoom in of the MEMS sensor error correction just before the first definite motion event at 36 seconds illustrates the nature and effectiveness of the linear acceleration corrections, L_bias, FIG. 1F, velocity corrections, FIG. 1G and position corrections, 1H at the pre-selected Tm=1 second period for no motion determination. It can be noted that as well as correcting the linear acceleration bias, the velocity and position are reset to zero after each Tm=1 second determination of no motion. The importance and effectiveness of these corrections are summarized in the zoomed position data. It should first be understood that just the sensor noise in the raw accelerometer signal, a(t) which is necessarily wide band for such general motion tracking is quite large at 3 mg rms. The deviation in the linear acceleration error correction computed from no motion velocity is over an order of magnitude reduced at <200 micro-g. Consistently the error deviation during the pre-event interval is less than 1 mm rms during a Tm=1 second interval. And further quite consistently, the resulting peak position deviation after 1 second of motion immediately following the last no motion correction interval was 1 mm for three consecutive events over a two minute interval as reported at the top of FIG. 1E. This illustrates the effectiveness and utility of the IMTD automatic correction of all MEMS errors.

The clearly visible quadratic with time variation of position due to linear acceleration error underlines the importance of an accurate correction. A shorter Tm or no correction at all could yield 10 or more times this error. Conversely a longer Tm would further reduce the error due to accelerometer noise but would require a longer period of no motion.

Figure 1L:
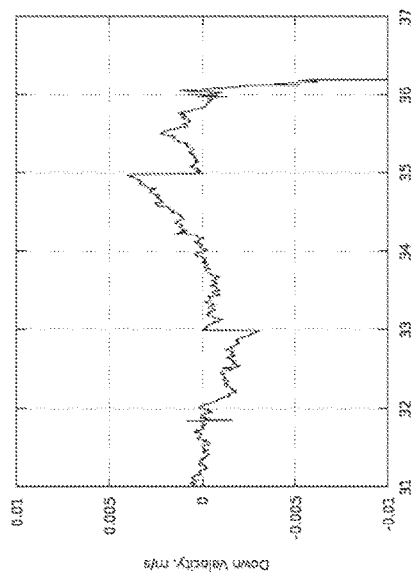
FIG. 1L summarizes prototype horizontal length measurements.

The adaptability of the IMTD to operate with accuracy and repeatability over a wide range of motion applications is further evidenced in FIG. 1L. The IMTD prototype used for vertical height measurements discussed above was used to measure the width of a table by sliding it quickly from the right edge to the left edge and back. Four measurements were made with a standard deviation or repeatability of 2.3 mm. The mean length was determined to be 1.137 m vs. 1.201 m (44 ⅛ inches) determined by a cloth tape measure. In this case the motion threshold was determined by velocity not linear acceleration. Velocity was computed as the change in position divided by no motion determination period, Tm=0.5 sec. An initial threshold of VA_thresh=7.5 mm/s was set by the MAA. When position exceeded a 5 cm position threshold, the velocity threshold, VA_thresh was adapted by the MAA to VA_thresh=0 so that the left edge of the table could be reached with zero velocity momentarily without initiating a no motion condition. The MAA further adapted the velocity threshold to VA_thresh=30 mm/s to conservatively ensure a terminal no motion correction accounting for additional errors induced during motion as well as the projected quadratic with time growth of the ~1 mm error due to no motion linear acceleration error correction residual increasing to ~10 mm position error or 6 mm/s peak velocity error after 3 seconds. After this forced no-motion correction period the MAA adapts VA_thresh back to the initial VA_thresh=7.5 mm/s ready for the next measurement.

It is known in the prior art to correct the velocity error when a separate or application dependent trigger is available (ZUPT) such as a heal contact or characteristic rotational motion of the foot to indicate a zero velocity condition has occurred, however low-noise correction of linear acceleration error has not been previously applied because of the difficulty of noise filtering and accurate measurement of this error in the inherently high dynamic MEMS applications and with the unpredictability of general human motion events. The dynamic range of natural motion signal variations, as illustrated in FIG. 1H to be less than 100 ug with no motion and in FIG. 1C to be greater than 2 to 4 g with sudden motion, makes a 1 Hz noise filter to estimate linear acceleration bias unusable. Yet the linear acceleration bias error is large and highly unpredictable for MEMS motion tracking. This is in part because of the errors in MEMS accelerometer scale factor and attitude determination or sensor alignment. A small 1 degree error from an attitude viewpoint would represent up to 17 mg of error in the correction of the 1 g gravitational acceleration. Such an uncorrected acceleration error integrated over a 1 or 4 second motion event would result in a final position error of 85 mm and 1368 mm, respectively. And this simple calculation already assumes zero initial velocity and position, i.e. zero velocity update or ZUPT has been applied.

To accurately determine this acceleration error and correct it just before the occurrence of a sudden unpredicted motion event without adding complex filters or inducing filter lag or transient errors during the motion is a purpose of the IMTD. To do so naturally without need for active human communication of intention and with a simple, intuitive, easy to use and adaptable digital motion tracking process, or Inertial Measurement Engine, that can be embedded in a MEMS IMU for general application. It is therefore useful to be able to achieve such performance with a simple digital motion processor which is herein described with a minimum number of parameters and computation steps.

The digital processor design to automatically mechanize the IMTD functions and specifically the Acceleration and Velocity and Position Correction (AVCP) Logic block in FIG. 1A are discussed in detail with reference to the IMTD Prototype design. The script for the combined logic blocks as implemented in Octave is provided in FIG. 1C which also comprises the no motion attitude correction. A line by line excerpt of the IME attitude and position determination and no motion corrections for a real time streaming implementation without buffering is extracted from FIGS. 1B and 1C for discussion in the text of Table 1 below.

(j−1)st velocity and position are set to zero and the current, jth velocity and position are re-computed (lines 010-013). Finally the linear acceleration bias, L_bias is corrected at line 013. An optional update gain, k_Lb<=1 can be applied to more gradually reduce noise or vibration errors. If the no motion condition is not met then no_motion=0. Finally, the jth values of velocity and position are stored in Vn_last and Pn_last, respectively and passed to MAA. The no_motion signal is also passed along with Vj an Pj as well as attitude Qj to the MAA for determining application-specific motion parameters of interest. For instance, the end of motion for distance measurement applications is determined by the MAA when the no_motion value changes from 0 to 1. The value of Pn_last is then held and reported as the position reached at the end of motion. The maximum value of

TABLE 1

```
001        Lj= Aj − L_bias;              %Corrected linear acceleration, L(t)
002        Vj= Vj + Gravity*Lj*dt        %Integrated velocity, v(t)
003        Pj=Pj + Vj*dt;                %Integrated position, p(t)
004        Sg=Sg+g; Sa=Sa+a; Sm=Sm+m;          %Sensor mean accumulators
005        if mod(j,Nm)==0,              %test for next correction time, t = n*Nm*dt=n*Tm
006           Vn=Vj;                     %current velocity, v(t)=v(n*Tm) or sample j=n*Nm
007           LA =(Vn−Vn_last)/Tm/Gravity;       %Compute average linear acceleration
%007          VA =(Pn−Pn_last)/Tm/Gravity;       %Compute average velocity(alternative)
008              if norm(LA(xsel)) < LA_thresh,    %test no_motion acceleration
%008             if norm(VA(xsel)) < VA_thresh,    %test no_motion velocity (alternate)
009                 no_motion = 1;                %Set no motion condition
010                 Vj_1=[0,0,0];                 %Reset velocity integrator i.c. value
011                 Pj_1=[0,0,0];                 %Reset position integrator i.c. value
012                 Vj=Vj_1+Gravity*Lj*dt;        %Re-compute corrected velocity
013                 Pj=Pj_1+Vj*dt;                %Re-compute corrected position
                    %%Linear Acceleration Error Correction Update%%
014                 L_bias=k_Lb*LA+L_bias;        %Update acceleration correction
                    %%Gyro bias and attitude update during no_motion
015                 g_bias=k_gb*(Sg/Nm-g_bias)+g_bias;
016                 a0 = Sa/Nm;
017                 m0 = Sm/Nm;
018                 DCM1=CompDCMStart(eye(3),m0,a0);
019                 Edcm=dcm2euler(DCM1');
020                 Qj=euler2quat(Edcm);
021            else,
022                 no_motion = 0;
023            end
024            Sg=0*Sg;Sa=0*Sa;Sm=0*Sm;
025            Vn_last=V(j,:);                    %save last periodic velocity, v((n−1)*Tm)
026            Pn_last=P(j,:);                    %save last periodic position, p((n−1)*Tm)
027        end
```

The normal operation for the jth sensor data sample at frequency fs or sample interval dt=1/fs, is illustrated in lines 001 to 003 which form and integrate the corrected linear acceleration, Lj, velocity, Vj and position, Pj and also introduced illustratively in continuous form, in FIG. 1A, as linear acceleration, L(t), velocity v(t) and position, p(t), respectively in FIG. 1A. The raw accelerometer, a, raw gyro, g and raw magnetometer, m, signals are summed in line 004 for computation of their mean values in the sequel described.

Every Nm samples or Tm=Nm*dt seconds as determined in line 005 the nth no motion condition is checked at line 005 by using the current velocity, Vn=Vj where j=n*Nm and time t=n*Tm=n*Nm*dt and the previous velocity at the last, (n−1)th no motion check, Vn_last at time t=(n−1)*Tm to compute an average linear acceleration, LA over the nth Tm second interval and thereby providing inherent acceleration noise reduction without the use of a filter. To determine a no motion condition the norm of LA is compared with a no motion threshold LA_thresh. If LA is below this threshold then a no_motion condition is determined (line 008) and the position during motion, e.g. jump height, can also be determined in real time by the MAA as detailed in FIG. 1D.

The no motion AVPC block implemented with the procedure just discussed removes any accumulated errors at the start of definite motion. To minimize generation of errors during motion it is desired to use the correct attitude during no motion and motion conditions. This is achieved in the IME in lines 015 to 020 above by implementing an update of gyro bias and of attitude using magnetometer and accelerometer data that is highly coordinated by the new no motion condition determined above from velocity change relative to a motion threshold. Firstly, in reference to FIG. 1B is defined the initial portion of the IME processing to determine attitude and position during motion conditions. Attitude propagation using quaternions is employed and is initialized earlier using the accelerometer and magnetometer to measure local Earth gravity and Magnetic field vectors the initial attitude relative to local Earth coordinates. The acceleration is then transformed from body to local Earth coordinates using a direction cosine matrix from this quaternion attitude. Finally, local Gravity is removed from this local acceleration along with L_bias the no-motion determined acceleration error correction as already discussed above in line Table 1, line 001.

Returning then to Table 1, beginning with line 015, we now describe the IME integrated no motion error correction processing of the IME comprising the discussed complete acceleration, velocity and position correction along with the new coordinated no motion attitude updates and gyro bias corrections. An accumulation of sensor values (line 004) during each period Tm is computed and reset to determine their mean values. These are used for gyro bias correction, with a selected update gain k_gb and for 3-axis attitude update using the mean sensor values as the Earth gravity and Magnetic Field vectors for computing a new attitude direction cosine matrix, DCM1 line 018. This is then transformed to an updated quaternion parameterization, Qj to replace the original Qj attitude computed in the motion processing section in FIG. 1B. There are many methods to accomplish an effective gyro bias and attitude update. For example the direction cosine matrix could be updated incrementally based on weighted increments from the accelerometer, magnetometer and gyro, rather than being periodically recomputed. The common feature is to heavily or exclusively weight the contribution of the accelerometer during the above determined no motion condition.

The above general purpose Inertial Motion Engine is suitable for inclusion in an embedded MEMS IMU digital processor and use by subsequent application-specific motion analysis processors or programs. The IME position processing inputs are raw linear acceleration, A(t), selected no motion measurement period, Tm and no motion threshold, LA_thresh and its outputs are position, p(t) and optionally velocity, v(t), acceleration correction error, L_bias, last periodic position, Pn_last and last periodic velocity, Vn_last, and a no motion signal, no_motion. For applications involving motion of interest in less than three dimensions, a further logic input to deselect 1 or 2 axes can be anticipated, e.g. for kite board use, velocity across the surface is not of interest. This axis de-selection can be done before taking the norm of LA, e.g. norm(LA(:,xsel)) where xsel=[3] to select the z axis or xsel=[1,2,3] to select all three axes.

The adaptability of the IMTD to operate with accuracy and repeatability over a wide range of motion applications is further evidenced in FIG. 1L. The IMTD prototype used for vertical height measurements discussed above was used to measure the width of a table by sliding it quickly from the right edge to the left edge and back. Four width measurements were made along the Y axis with a standard deviation or repeatability of 2.3 mm. The mean width was determined by the IMTD to be 1.137 m vs. 1.128 m determined by a cloth tape measure.

It is well known that sliding an object involving friction can produce a noisy, high frequency acceleration and noisier velocity than lifting or jumping into the air. This acceleration is also typically at low level and may cross zero several times in a stick-slip fashion. Therefore, in this application case the motion threshold was determined by average velocity computed from change in position and not average linear acceleration computed from change in velocity. The IME can alternately calculate an average velocity at line 008 in Table 1 of VA=(Pn−Pn_last)/Tm and compare its norm with a velocity threshold VA_thresh. When horizontal measurement is desired the MAA selects the alternate average velocity calculation for line 008 and selects axes xsel=1 or 2 to compute the norm of VA. In this application for quick horizontal measurements Tm is set to 0.5 sec and an initial threshold of VA_thresh=7.5 mm/s was set by the MAA. When position exceeds a 5 cm position threshold, P_thresh=5 cm, the velocity threshold, VA_thresh was adapted by the MAA to VA_thresh=0 so that the left edge of the table could be reached with zero velocity momentarily without initiating a no motion condition. The MAA further adapts the velocity threshold to VA_thresh=30 mm/s to conservatively ensure a terminal no motion correction, accounting for additional errors induced during motion as well as a projected quadratic with time growth of the ~1 min error due to no motion linear acceleration error correction residual. This error would increase to ~9 mm position error or up to ~6 mm/s velocity error after 3 seconds. After this forced no-motion correction period the MAA adapts VA_thresh back to the initial VA_thresh=7.5 mm/s ready for the next measurement.

The value of Tm and the acceleration threshold, LA_thresh for determining no motion can be readily adapted to user's needs for performance vs. minimum period of no motion before definite motion and the inherent no-motion stability of the application. For instance for kite board application illustrated in FIGS. 1M, 1N, 1P, and 1Q board-mounted raw accelerometer output there is continual high frequency vibrations in the 1 or 2 g range and very large transients of up to 10 g after a jump and return back to water. Several seconds before each jump the vibration of the board on the water surface can result in board vibration with on-water acceleration deviations of a hundred mg over 1 second averaging intervals. A higher value of fixed LA_thresh or a longer Tm could bound or average these vibrations avoiding a false motion condition while on the water yet ensure a definite no-motion condition at end of jump and return to water. The IMTD algorithm comprising the IME and a Motion Analysis and Adaptation (MAA) program, detailed in FIG. 1D adapted for this application was applied to recorded board-mounted MEMS sensors before a prototype IMTD device was available. For the jump and water conditions illustrated, LA_thresh=300 mg and Tm=1 was found to avoid significant false motion yet did not interfere with automatic and accurate jump detection. This is illustrated in the position output, p(t) in FIG. 1Q reaching a well-defined peak height of 6.8 m. This illustrates the general utility of the IME with a simple-enough computation suitable for a real time embedded digital processor. The MAA in this case, for jump height and rotation analysis, and defined in FIG. 1D, has been successfully compiled along with the IME in a 16-bit RL78/G13MCU.

Some allowance also needs to be made for integration of the residual acceleration correction error as well as dynamic errors accumulating during motion. For long jumps with up to 10 seconds of air time, while the peak height is usually attained in a second or two, the error in position is growing quadratically with time. To overcome this issue the value of LA_thresh could be adapted vs duration of the motion condition according to a simple error prediction based on the original no-motion acceleration deviation. In the floor-based prototype result in FIG. 1E the very low 200 micro-g deviation in L_bias during no motion and resulting position error was 1 mm after 1 second. The value of LA_thresh was comfortably set at 500 micro-g so a no-motion condition was successfully again reached after the 4 second event time without adaptation because the variation in linear acceleration, LA was much less than LA_thresh. Alternatively, a maximum air time or motion duration could be set after which a no-motion condition would be forced to occur by raising LA_thresh after motion begins.

For measurement applications where there is user discretion and where the error of the end position not the peak position is relevant it would be appropriate to indicate to what quality of no-motion stability the user was achieving and what accuracy could be achieved with that no-motion stability after say a 1 second motion or a 3 second motion so that he could conduct the measurement operation accordingly. Detection of the maximum value of position P during, say, a jump or hand motion can be done automatically with peak detector logic as illustrated in FIG. 1D or after the motion analyzing stored values of P.

There are of course several ways to implement the above IME digital processing with equivalent result. For example, the regular motion steps 001 to 003 could be placed after the no motion condition (lines 004 to 0022) is evaluated. With lower sample frequency, the simple Euler digital integrator, e.g. line 002 could be replaced with a higher order integrators such as trapezoidal or Pade 4th order to reduce computation errors. A simple digital processor is required to compute a change in the velocity during a selected time period, Tm to determine an average acceleration and a no motion condition relative to a defined motion threshold, LA_thresh and to apply a linear acceleration error correction, velocity error correction and position error correction when there is no motion.

The desired IMTD digital processing to autonomously detect no motion and correct acceleration, velocity and position has been compiled into the firmware of a prototype Sensoplex SP-10C embedded 16-bit Renesas G78/13 microcontroller interfaced with an MPU9250 6-axis MEMS IMU including 3-axis magnetometer. The additional computing resource was less than 124 bytes of program memory and 32 bytes of data memory above the resources required for basic MEMS IMU data acquisition, storing sensor data to flash memory and communicating via the Bluetooth Low Energy (BLE) radio. The simplicity of such an IME would enable a number of other embedded hardware implementations including code in an 8-bit MCU, field programmable gate array (FPGA) or, preferably, directly embedded in the digital motion processor in the MEMS IMU ASIC. The latter could directly implement and synchronize no-motion attitude and gyro bias corrections in the MEMS IMU and eliminate the need for a separate dedicated MCU for digital sensor data handling and motion processing. This would transform the MEMS IMU chip with complex sensor signal interface into an Inertial Navigation Unit (INU) chip with standard velocity, position and attitude outputs in Earth coordinates. Furthermore, the IME could operate with samples up to the natural frequency of the MEMS sensor which for Coriolis gyroscopes and resonant accelerometers can be several tens of kHz. This can push quantization noise out of band and obviate correction of numerical integration errors due to high frequency coning and sculling and enable simple Euler integration with negligible error. Finally addition of a wideband radio and antenna for communication and navigation along with autonomous power source such as solar cell or battery would provide a Universal Navigation Chip or UNC. This would provide for the first time compact and complete personal situational awareness from the surrounding electromagnetic waves and the internal inertial waves generated by the MEMS sensors to sense inertial motion and to collectively determine the most accurate velocity, position and orientation versus time.

It is noted that the linear acceleration signal generated by the accelerometer signal, a(t) and attitude signal, Q(t), or gyro, accelerometer and magnetometer data used to generate Q(t) in the MCU should be sampled by the MCU at the highest possible sample rate available and with the highest available resolution for the anticipated range of motion. For example a sample frequency, fs=100 Hz or higher and a digital sensor data resolution of at least 16 bits or higher is desirable to minimize the computation errors in high dynamic motion applications. Calibration of the fixed MEMS sensor bias, alignment and scale factor errors at the factory or before operational use will reduce these errors that may otherwise combine to produce linear acceleration errors during high dynamic rotation and translation motion that can accumulate into additional velocity and position errors during motion.

In other embodiments the accelerometer, gyroscope and magnetometer signals may be received by the MCU from a single MEMS motion sensing chip such as the MPU9150 or MPU9250. The microcontroller may be a low power 16-bit single-chip MCU such as the Rensesas R78/GL13 or the Texas instruments MSP430 in which the functions in FIG. 1A are implemented in a firmware program. Alternatively the simple structure of the signal processing lends itself to implementation with physical adders and multipliers as may be found in a field programmable gate array (FPGA) or an application specific integrated circuit (ASIC) such as may already be used in the MEMS IMU for digital motion processing for attitude computation.

Accordingly those skilled in the art will appreciate that with this one embodiment an Inertial Motion Tracking Device is provided that tracks its motion with optimum accuracy using compact practical motion sensors that may have noise and drift by using an Inertial Measurement Engine that periodically and autonomously checks its velocity changes at an optimum interval, computing a linear acceleration therefrom and determining a no- motion or motion condition relative to a threshold and correcting its velocity, position and acceleration errors while there is no motion. It is intuitive to use, requiring no user-activated trigger and provides measurements in standard three dimensional local Earth coordinates.

Many other ramifications and variations are possible with the teachings of this embodiment relative to the component sensors and digital processor designs, implementation and integration to yield the new improved accuracy, intuitive ease use of use, and the general applicability yet simplicity of the described IMTD. Three IMTD motion applications were discussed above for measuring lifted height above a floor, jump height above and ocean and horizontal distance traveled while sliding an object. The parameters of a general purpose Inertial Motion Engine computing all of the integrals of motions for attitude, velocity and position at high speed and fidelity were adapted for each application by a Motion Analysis and Adaptation processor. However, numerous types of motion applications and motion parameters can be contemplated, including three-dimensional measurements of jump height and length, or shape, as in snowboarding or two and three-dimensional measurements of dimensions of objects or maps of rooms and buildings, Velocity as well as position may be a motion parameter for some applications, e.g. a pitched baseball or a bat. Attitude parameters such as rotation during a jump can also be computed in real time by the MAA from the quaternion, Q(t). Characteristic attitude changes associated with a typical sporting event may be used by the MAA to more optimally define the IME parameters for a given application. Optimized gyro bias determination, g_bias can be contemplated where the update gain, k_gb is more or less slowly adapted by the MAA based on analysis of the variance of the gyro rate during each no motion interval, Tm. Likewise optimized average acceleration error or bias, L_bias and update gain, k_Lb can be similarly adapted using the accelerometer deviation. Initial start of use of an IMTD could routinely attempt such an optimum determination during an averaging period and signal to the user when the IMTD is ready for use. Intentional user motion, detected by the MAA at start of use for IMTD calibration of accelerometer of magnetometer biases or scale factors is also possible. For example a user could rotate the IMTD referenced to a table through 360 degrees about each IMTD axis or it could flipped onto its six different faces to calibrate accelerometer biases and scale factor. These biases and scale factor could be adapted with temperature using a temperature sensor typically available from a MEMS sensor. More sophisticated calibration by the MAA of sensor biases, scale factors and average linear acceleration error correction L_bias from receipt of other sensor information such as the output of an atmospheric pressure sensor or a radio navigation receiver, such as a GPS receiver. While a pressure sensor is very noisy so requires filtering; however it can provide an IMTD calibration reference for motion tracking over long time intervals. The GPS altitude error is typically 5 to 7 m and large in comparison to the ITMD resolution of 1 mm; however, the GPS position is referenced to a standard global Earth coordinate frame and the reported attitude or heading is also relative to true North not magnetic north. Having embedded GPS information allows the IMTD to report its position measurements in standard global Earth coordinates with GPS accuracy but with much higher resolution than with GPS alone.

The MAA adaptation of the IME use described above selected from a set of fixed parameters that could be defined permanently in the program for each type of IMTD or downloaded from the user via radio. Alternatively, the MAA itself could compute and adapt the optimum IME parameters based on real time or other statistical analysis of its errors and experience for a given application. An MAA with default parameters could be embedded along with an IME in a MEMS device for basic measurement utility with the option to remotely change the default values based on a more sophisticated external MAA processor. The AVCP logic block itself operates at relatively slow periodic rate relative to the high speed, very low latency processing of the integrals of motion so some portions of the IME or the MAA are candidates for external processing. Further IMTD embodiments enabled by the basic IMTD described in this first embodiment with its universal IME and application-specific MAA are next described.

2. Exemplary Inertial Motion Tracking Device (IMTD) with MEMS IME

Figure 2:
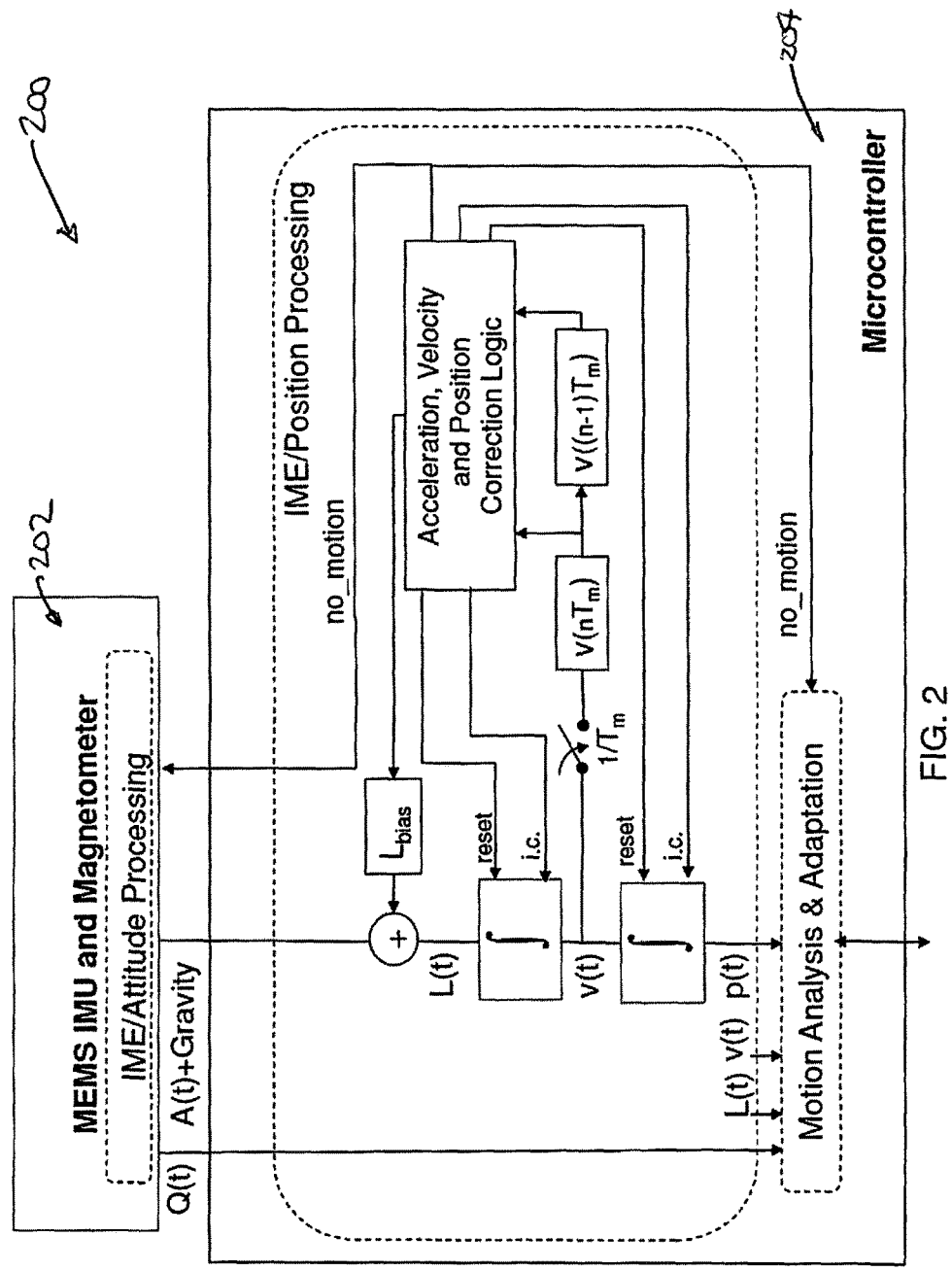
FIG. 2 shows example IMTD with MEMS IME showing aspects of an inertial motion tracking device where at least the motion-dependent attitude of the IME being is computed by a digital processor embedded in the MEMS Sensor chip and where the required no_motion signal is provided by the acceleration, velocity and position error correction (AVPC) processor in the either in the MEMS Sensor chip or the Microcontroller (MCU) and where the MAA is in the MCU.

One alternate IMTD 200 embodiment can be used with a MEMS IME. The motion-dependent attitude processor of the IME in FIG. 2 is implemented in a digital processor embedded in the MEMS IMU 202 or sensor assembly chip using a no_motion signal derived from an IME AVPC block computed in connected host MCU. The 6-axis or 9-axs MEMS sensors or MEMS IMU and Magnetometer furnish a quaternion attitude signal Q(t) and raw linear acceleration signal A(t)+Gravity to the Position component of the IME in the host MCU 204. Unless noted operation of this embodiment is consistent with device 100 described above.

The motion quaternion computed by the FIG. 1B IME and the no motion gyro bias and attitude updates computed by the IME in FIG. 1C could be located in a digital motion processor within the MEMS IMU or sensor assembly. MEMS IMU chips do not offer position measurement but do have a corrected attitude using an embedded digital motion processor (DMP). Embedding the attitude computations of the IME in this DMP would enable lowest latency, highest update rate, lowest power attitude during motion and no motion conditions, while maintaining strict coordination of the sensor error corrections for accurate motion tracking. Two axis attitude corrections using only the accelerometer measured gravity vector to update the embedded quaternion calculation can be performed or three-axis attitude corrections using the additional Earth magnetic field vector measurement provided by the magnetometer as detailed in FIG. 1C can be used to provide convenient local Earth coordinates for the position measurements. This can also significantly reduce the cost and complexity of the MCU required for the remaining IME position determination and the MAA. Control and coordination of the existing attitude processing in an InvenSense MPU9150 or MPU9250 by an IME processor in the host MCU would be one alternative embodiment. Alternatively the full IME attitude and position determination could be embedded in a later version of a MEMS IMU chips.

3. Exemplary Inertial Motion Tracking Device (IMTD) with MCU Module

Figure 3:
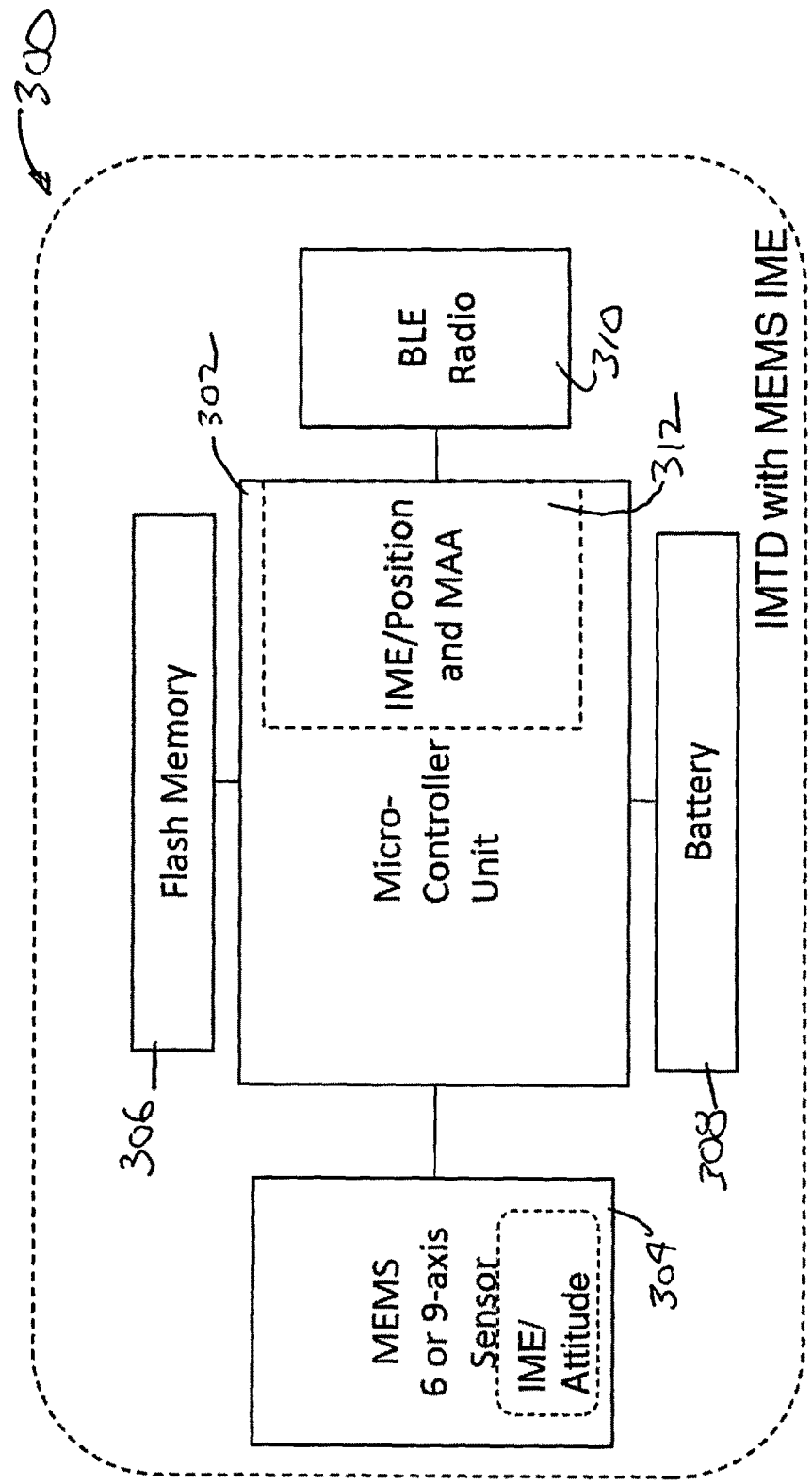
FIG. 3 shows another example inertial motion tracking device in accordance with another embodiment comprising a MEMS 6 or 9-axis sensor chip, Microcontroller Unit operating an IMTD Application, comprising IME and MAA subroutines, a memory a battery power source and a Bluetooth low energy radio.

A compact, autonomous dedicated motion tracking device 300 is shown in FIG. 3 comprising a central MCU 302 connected to a 6- or 9-axis MEMS Sensor 304 assembly, Flash Memory 306, a Battery power source 308 and a low power Bluetooth (BLE) Radio 310. An IMTD Application 312 comprising an IME and MAA is operated by the MCU. The attitude portion of the IME processing may be embedded in the MEMS Sensor. Unless noted operation of this embodiment is consistent with devices 100, 200 described above.

The particular implementation of an Inertial Motion Tracking Device (IMTD) in FIG. 3 can be made quite compact and relatively low cost compared to say a smartphone so that it could be mounted on a various pieces of personal sports equipment such a kiteboard to keep track of its height about water. The IMTD comprises an IME and MAA for on-board real-time analysis and calculation of motion parameters, such as jump height. Alternatively only data from significant events could be stored in Flash Memory for subsequent re-construction analysis by the MAA. In this way only the wanted information needs to be transferred via radio to a user, rather than streaming high speed data for remote processing. This greatly conserves the limited power available while offering real-time motion statistics to the user via BLE Radio by the user with a nearby smartphone or a video recording device.

4. Exemplary Inertial Motion Tracking Device (IMTD) in Smartphone

Figure 4:
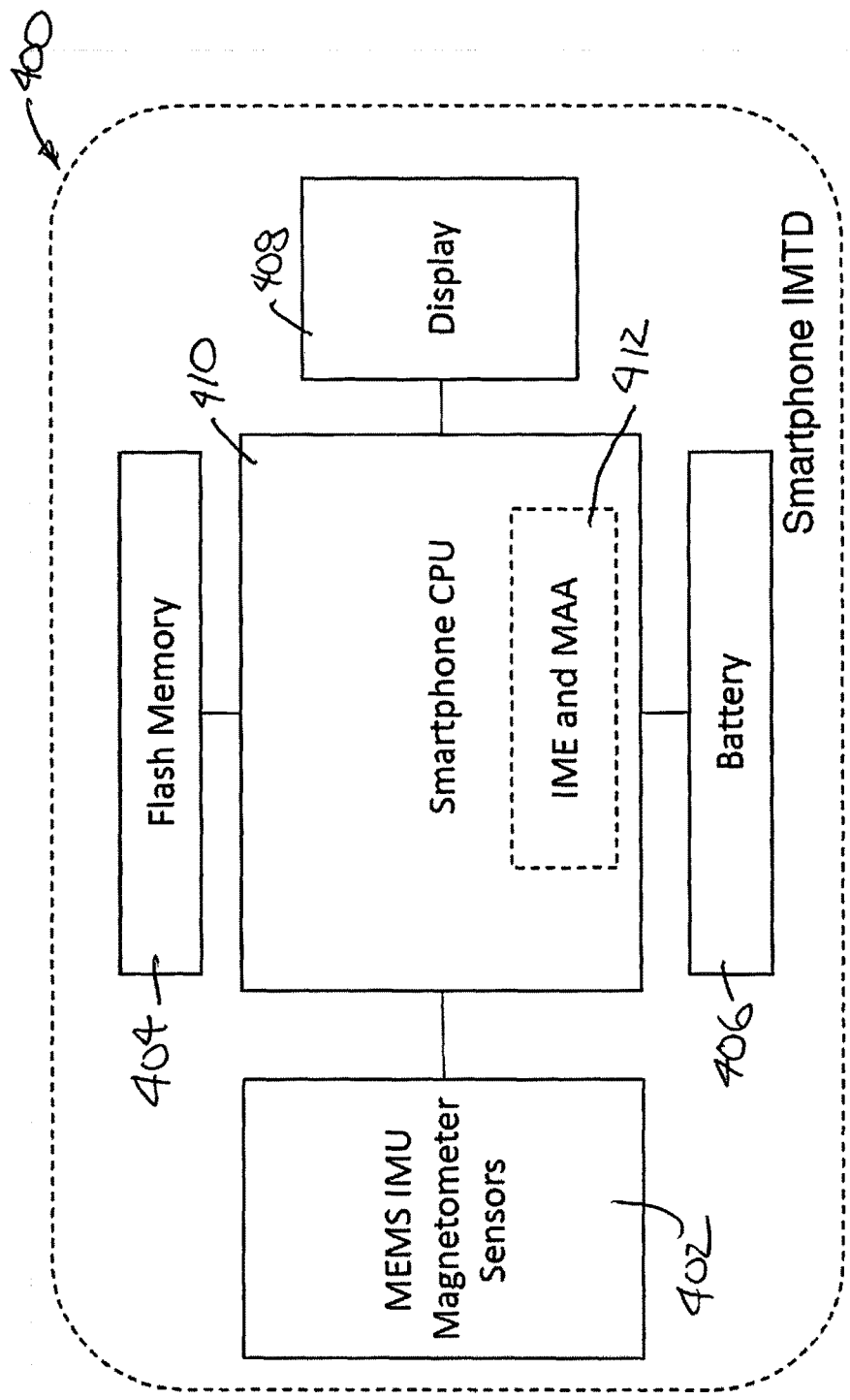
FIG. 4 shows another example inertial motion tracking device in accordance with another embodiment comprising an IMTD Application operating in a Smartphone CPU with internal MEMS IMU and Magnetometer Sensor chip.

The IMTD 400 embodiment in FIG. 4 is substantially a regular smartphone with internal MEMS sensors comprising MEMS and Magnetometer 402, memory 404, power source 406 and display 408 and a Central Processing Unit (CPU) 410. The IMTD 300 described in embodiment 3 is now implemented as an App 412 in this CPU 410, replacing the MCU. Alternatively, the IME or IME and MAA could be implemented in a co-processor or core motion processor connected to the CPU for other Smartphone Apps in the CPU to access and receive motion parameters from the MAA. Unless noted operation of this embodiment is consistent with devices 100, 200, 300 described above.

An alternative for some sporting events could utilize an IME resident in an equipment-mounted MCU and connected with a BLE Radio under the control of an MAA resident in a smartphone CPU also connected with a BLE Radio. The IME could be directed by the MAA to store certain position and velocity segments of interest, e.g. around a jump, in the Flash Memory connected to the MCU. These segments could be subsequently sent to the smartphone-resident MAA for analysis and display to the user.

Operation—Alternative Embodiment 4:

The smartphone IMTD is operated as in the above embodiments with dedicated hardware but now is more suited for making personal measurements for work or pleasure, including any games involving motion measurement. It is also easy and intuitive to use without a user-activated trigger and provides Earth coordinate position measurements for both measurement and mapping. The IMTD in this embodiment would provide a convenient, measurement tool with acceptable measurement accuracy now afforded by the IME with complete error correction and intuitive ease of use without requiring a user-activated trigger or anticipation of motion. With the advanced mm accuracy or repeatability demonstrated by the IME error correction many new human uses and applications can be anticipated.

5. Exemplary Inertial Motion Tracking Device (IMTD) in Advanced Smartphone

Figure 5:
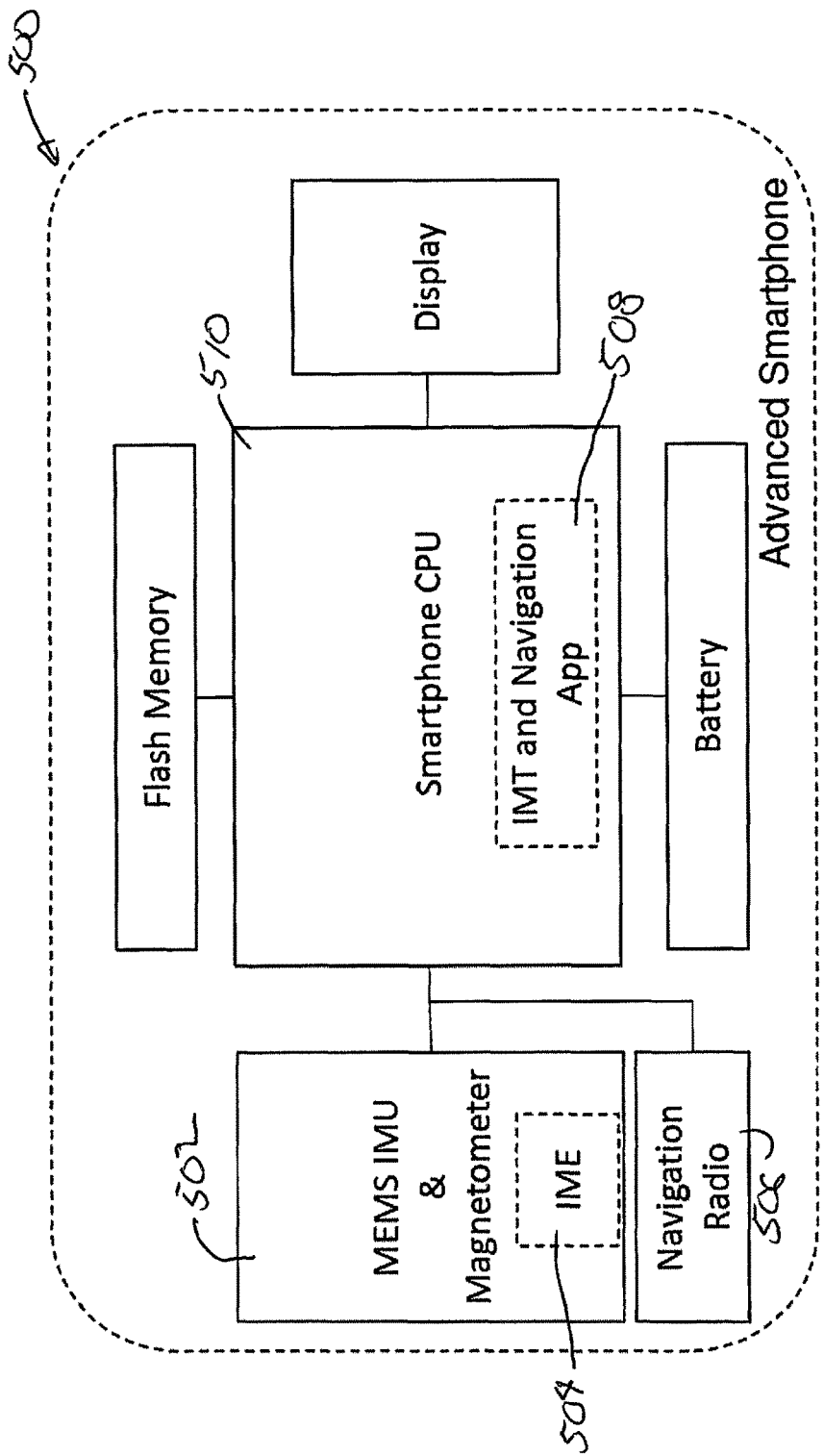
FIG. 5 shows another example inertial motion tracking device in accordance with another embodiment in a Smartphone comprising a MEMS IMU and Magnetometer chip with an embedded Inertial Motion Engine and an Inertial Motion Tracking and Navigation Application operating in the Smartphone CPU.

The embodiment of an IMTD 500 in a next generation, Advanced Smartphone is shown in FIG. 5. It comprises a high performance MEMS IMU and Magnetometer chip 502 with a fully functional Inertial Measurement Engine 504 furnishing integrated position, velocity as well as attitude. This chip is also now closely connected with a Navigation Radio chip 506. The Motion Analysis and Adaptation of the IMTD is also integrated with a Navigation Application 508 in the smartphone CPU 510. Unless noted operation of this embodiment is consistent with devices 100, 200, 300, 400 described above.

Its principle improvement relative to embodiment 4 is that the IME is fully embedded in the MEMS IMU with highest quality sensor data access to provide improved error-corrected acceleration, velocity and position, as well as attitude. The Motion Analysis and Adaptation (MAA) of the IMTD is also integrated with a Navigation Application such as a GPS program in the smartphone CPU to provide accurate, high resolution local position determination in global Earth coordinates. At each no motion correction the position is set to the most recent GPS position rather than to zero as in the First Embodiment, line 011 in Table 1. This enables an unprecedented degree of personal situational awareness.

6. Exemplary Inertial Motion Tracking Device (IMTD) with Universal Navigation Chip (UNC)

Figure 6:
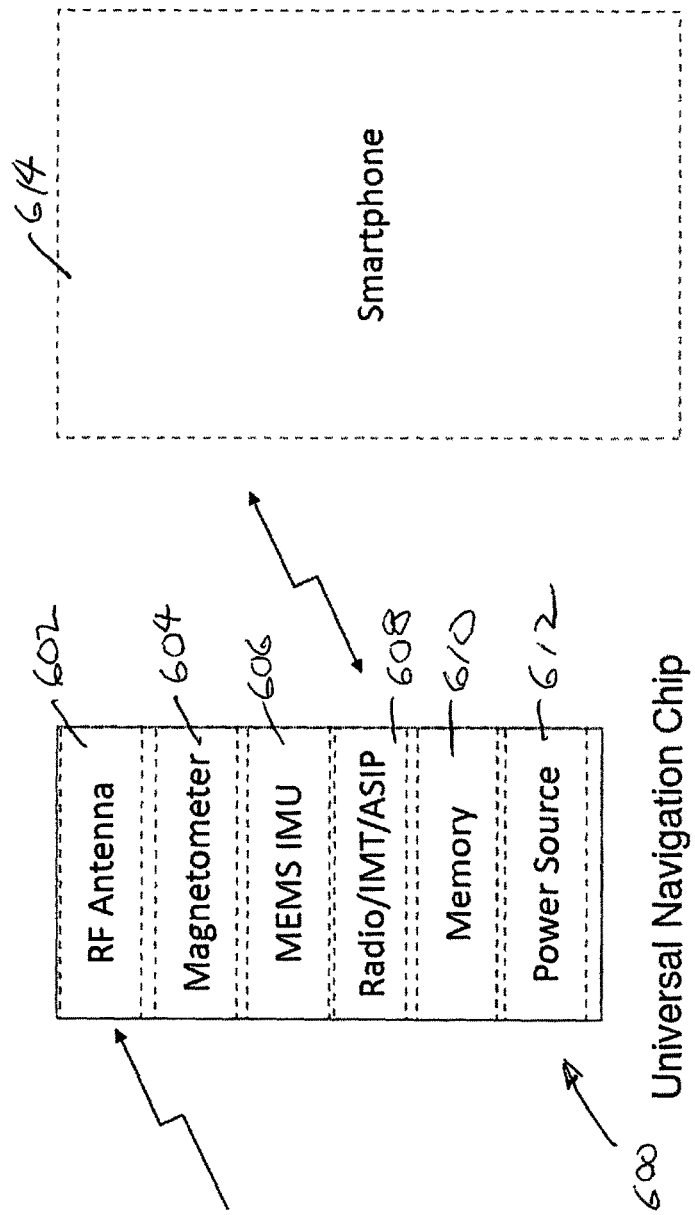
FIG. 6 shows another example inertial motion tracking device in accordance with another embodiment in a Universal Navigation Chip (UNC) comprising an RF Antenna, MEMS IMU, Magnetometer, Application Specific Processor chip comprising embedded RF navigation sensors, IME processor, a combined local motion tracking and global navigation application processor and radio communication, a Memory and a Power Source.

An IMTD 600 implemented in a single Universal Navigation Chip or System in Package is shown in FIG. 6 comprising an RF Antenna 602, Magnetometer 604, MEMS IMU 606, and an ASIC 608 comprising radio circuits for detecting radio waves carrying navigation information such as from a GPS satellite, application specific integrated processor operating the IME, MAA and radio navigation processing, a memory 610 and a power source 612. The UNC can communicate its global position and attitude via radio to a nearby smartphone 614. Unless noted operation of this embodiment is consistent with devices 100, 200, 300, 400, 500 described above.

The UNC of FIG. 6 provides the benefits of above embodiments for an Inertial Motion Tracking Device in compact, low cost form to provide a human user or personal equipment nearby with position in global Earth coordinates with unprecedented millimeter resolution. Its autonomy and embedded radio for navigation and communication provide the opportunity for self-test and self-calibration during use thereby avoiding expensive manual testing and calibration during manufacturing. The UNC with embedded IMTD can be the basis for highly compact personal situational awareness with the highest level of accuracy and ease of use.

Those skilled in the art appreciate that, according to the above embodiments of the invention, an Inertial Motion Tracking Device is described that tracks its motion with optimum accuracy using compact practical motion sensors that may have noise and drift by using an Inertial Measurement Engine that periodically and autonomously checks its velocity changes at an optimum interval, computing a linear acceleration therefrom and determining a no- motion or motion condition relative to a threshold and correcting its velocity, position and acceleration errors while there is no motion. It is intuitive to use, requiring no user-activated trigger and provides measurements in standard three dimensional Earth coordinates.

While the above description contains many details, they should not be construed as limitations on the scope of any embodiment, but as exemplifications of various embodiments thereof. Many other ramification and variations are possible with the teachings of the various embodiments. For example the Gravity removal in FIG. 1A could be performed in body coordinates instead of local coordinates or the position and velocity of the IMTD could be computed first in body coordinates and then transformed to local coordinates. And any number of digital processor implementations for the IME or MAA functions from soft to firm to hard could be utilized including for example a custom Application Specific Integrated Circuit. One, two or three dimensional motion can be tracked. Any MEMS configurations providing at least accelerometer and gyro sensors can be used, e.g. from ST Micro or Analog Devices.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. An inertial motion tracking device (IMTD) comprising:
a microcontroller programmed with Inertial Measurement Engine (IME) that performs the operations of:
receiving accelerometer and gyroscope input;
computing linear acceleration, velocity and position of the IMTD from the accelerometer and gyroscope input where a linear acceleration value is determined from said accelerometer and gyroscope input, a velocity value is computed using a velocity integrator operating on the linear acceleration value and a position value is computed using a position integrator operating on the computed velocity value;
determining whether a no motion condition has occurred with an Acceleration, Velocity and Position Correction (AVPC) logic block over repeating time periods, where the no motion condition exists when either the AVCP logic block receives the linear acceleration value and determines it is below a selected linear acceleration change threshold or the AVCP logic block receives and compares a current velocity value and a previous velocity value and determines a change in the velocity integrator value is below a selected velocity change threshold; and
after said no motion condition the velocity integrator value and the position integrator value are reset and a linear acceleration bias value is adjusted to zero the computed linear acceleration by the AVCP logic block;

wherein an initial period of the repeating time periods the velocity integrator value and the position integrator value are reset and the linear acceleration bias value is adjusted to zero the linear acceleration by the AVCP logic block.

2. The IMTD of claim 1, wherein the computed linear acceleration comprises an average linear acceleration determined from a velocity change over each of the repeating time periods.

3. The IMTD of claim 1, wherein a gyro bias is determined and corrected during said no motion condition and the correction of said gyro bias is applied with a predetermined gain.

4. The IMTD of claim 1, further comprising a Motion Analysis and Adaptation (MAA) processor that receives said IME computed linear acceleration, velocity and position and computes an output velocity, position, or time parameter of motion from a motion condition.

5. The IMTD of claim 1, wherein said MAA applies the IME computed, linear acceleration, velocity and position said to the no motion condition determination, the selected acceleration threshold, the selected velocity threshold, a duration of the repeating time period, or a predetermined gain to correct gyro bias.

6. The IMTD of claim 1, wherein said IME computation is performed by a 16-bit microcontroller unit.

7. The IMTD of claim 1, wherein said IME computation is performed by a MEMS chip.

8. The IMTD of claim 1, wherein said IME computation is performed by a smartphone processor.

9. The IMTD of claim 1, wherein said IME computation is performed by a Universal Navigation Chip.

10. The IMTD of claim 1, wherein the IME further computes an attitude of the IMTD and the attitude is referenced to local Earth coordinates with magnetic North and said position is relative to a local reference position.

11. The IMTD of claim 10, comprising a radio navigation receiver wherein said local reference position and said attitude are reset at each no-motion condition to the most recent position and attitude determined by said received radio navigation signal relative to global Earth coordinates.

12. The IMTD of claim 10, wherein the IMTD is started from a reference position, moved a distance without stopping, and then returned to rest at said reference position and a peak position value relative to said first reference position is determined and reported by an Motion Analysis and Adaptation (MAA) processor as a distance measurement.

13. The IMTD of claim 10, further comprising a Motion Analysis and Adaptation (MAA) processor, wherein the MAA processor receives said IME computed attitude, linear acceleration, velocity and position and computes an output attitude, velocity, position, or time parameter of motion from a motion condition.

14. The IMTD of claim 1, wherein the computed velocity comprises an average velocity determined from a position change over each of the repeating time periods.

15. The IMTD of claim 1, wherein a linear acceleration error is determined and corrected during said condition of no motion and the correction of said linear acceleration error is applied with a predetermined gain.

16. An inertial motion tracking device (IMTD) comprising:

an Inertial Measurement Engine (IME) receives digital accelerometer and gyroscope samples each sample time period and includes a linear acceleration value is determined from said accelerometer and gyroscope samples, a velocity integrator, a position integrator, and an Acceleration, Velocity and Position Correction (AVPC) logic block, where the velocity integrator computes a velocity value as the linear acceleration value scaled by the sample time period and the position integrator computes a position value as the velocity value scaled by the sample time period and the AVCP logic block receives and compares a current velocity value and a previous velocity value and determines whether a change in the velocity integrator value is below a selected velocity change threshold;

wherein the AVPC logic block periodically determines whether the change in the velocity integrator value remains below the selected velocity change threshold and if so the velocity integrator value and the position integrator value are reset and a linear acceleration bias register value is adjusted to zero the linear acceleration register value; and wherein after an initial AVPC time period the velocity integrator value and the position integrator value are reset and the linear acceleration bias register value is adjusted by the AVPC logic block to zero the linear acceleration register value.

17. An inertial motion tracking device (IMTD) comprising:

an Inertial Measurement Engine (IME) receives digital accelerometer and gyroscope samples each sample time period and includes a linear acceleration value is determined from said accelerometer and gyroscope samples, a velocity integrator, a position integrator, and an Acceleration, Velocity and Position Correction (AVPC) logic block, where the velocity integrator computes a velocity value as the linear acceleration value scaled by the sample time period and the position integrator computes a position value as the velocity value scaled by the sample time period and the AVCP logic block receives the linear acceleration value and determines whether it is below a selected linear acceleration threshold;

wherein the AVPC logic block periodically determines whether the linear acceleration value remains below a selected linear acceleration threshold and if so the velocity integrator value and the position integrator value are reset and a linear acceleration bias register value is adjusted to zero the linear acceleration register value; and wherein after an initial AVPC time period the velocity integrator value and the position integrator value are reset and the linear acceleration bias register value is adjusted by the AVPC logic block to zero the linear acceleration register value.

* * * * *